US012723758B2

(12) United States Patent
Vukanti et al.

(10) Patent No.: US 12,723,758 B2
(45) Date of Patent: Sep. 1, 2026

(54) FUEL NOZZLE AND SWIRLER

(71) Applicant: General Electric Company, Schenectady, NH (US)

(72) Inventors: Perumallu Vukanti, Bengaluru (IN); Pradeep Naik, Bengaluru (IN); Michael T. Bucaro, Arvada, CO (US); Ajoy Patra, Bengaluru (IN); Manampathy G. Giridharan, Evendale, OH (US); Steven C. Vise, West Chester, OH (US); R Narasimha Chiranthan, Bengaluru (IN); Michael A. Benjamin, West Chester, OH (US); Clayton S. Cooper, Evendale, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 31 days.

(21) Appl. No.: 17/700,852

(22) Filed: Mar. 22, 2022

(65) Prior Publication Data

US 2023/0194095 A1 Jun. 22, 2023

(30) Foreign Application Priority Data

Dec. 21, 2021 (IN) .............................. 202111059811

(51) Int. Cl.
*F23R 3/14* (2006.01)
*F02C 3/22* (2006.01)
*F23R 3/28* (2006.01)

(52) U.S. Cl.
CPC .................. *F23R 3/14* (2013.01); *F02C 3/22* (2013.01); *F23R 3/286* (2013.01)

(58) Field of Classification Search
CPC .... F23R 3/14; F23R 3/286; F23R 3/12; F23R 3/38; F02C 3/22; F02C 9/40
See application file for complete search history.

(56) References Cited

U.S. PATENT DOCUMENTS 3,958,416 A * 5/1976 Hammond, Jr. .......... F23R 3/34 60/39.23
4,515,094 A * 5/1985 Azuhata .................... F23D 1/02 110/263

(Continued)

FOREIGN PATENT DOCUMENTS

CN 102563698 7/2012
EP 4202303 B1 6/2023

OTHER PUBLICATIONS

John_Swirl Generation and Recirculation Using Radial Swirl Vanes_ 1993 (Year: 1993).*

(Continued)

*Primary Examiner* — Gerald L Sung
*Assistant Examiner* — Jingchen Liu
(74) *Attorney, Agent, or Firm* — Carter, DeLuca & Farrell, LLP

(57) ABSTRACT

An engine can utilize a combustor to combust fuel to drive the engine. A fuel nozzle assembly can supply fuel to the combustor for combustion or ignition of the fuel. The fuel nozzle assembly can include a swirler and a fuel nozzle to supply a mixture of fuel and air for combustion. Increasing efficiency and emission needs require the use of alternative fuels, which combust at higher temperatures and faster burn speeds than traditional fuels, requiring improved fuel introduction without the occurrence of flame holding or flashback.

20 Claims, 9 Drawing Sheets

(56) References Cited

U.S. PATENT DOCUMENTS

| | | | | |
|---|---|---|---|---|
| 5,603,211 | A | 2/1997 | Graves | |
| 5,987,889 | A | 11/1999 | Graves et al. | |
| 6,622,488 | B2 | 9/2003 | Mansour et al. | |
| 7,788,927 | B2 | 9/2010 | McMasters et al. | |
| 8,128,007 | B2 | 3/2012 | Thomson et al. | |
| 8,240,151 | B2 | 8/2012 | Pelletier et al. | |
| 8,312,724 | B2 * | 11/2012 | Dai | F23R 3/286 60/737 |
| 9,239,167 | B2 | 1/2016 | Williams et al. | |
| 9,310,080 | B2 * | 4/2016 | Toon | F23D 11/105 |
| 9,423,133 | B2 | 8/2016 | Gomez del Campo | |
| 10,228,137 | B2 | 3/2019 | Kopp-Vaughan et al. | |
| 10,429,071 | B2 | 10/2019 | Williams | |
| 11,092,340 | B2 | 8/2021 | Matsuyama et al. | |
| 11,885,497 | B2 * | 1/2024 | Lao | F23R 3/283 |
| 2004/0123597 | A1 * | 7/2004 | Kraft | F23D 14/64 60/737 |
| 2006/0191268 | A1 * | 8/2006 | Widener | F23D 14/48 60/740 |
| 2010/0275604 | A1 * | 11/2010 | Hall | F23D 11/103 60/748 |
| 2016/0160616 | A1 * | 6/2016 | Moen | E21B 43/12 166/227 |
| 2017/0045231 | A1 * | 2/2017 | Stevenson | F23D 11/12 |
| 2018/0045415 | A1 | 2/2018 | Dai et al. | |
| 2019/0032559 | A1 * | 1/2019 | Dai | F23R 3/343 |
| 2020/0248903 | A1 * | 8/2020 | Sampath | F23R 3/14 |
| 2020/0408407 | A1 | 12/2020 | Tentorio et al. | |

OTHER PUBLICATIONS

Chinese Office Action for application No. 202211016898.2 dated Mar. 27, 2025 with English translation, 16 pages.

* cited by examiner

FUEL NOZZLE AND SWIRLER

CROSS-REFERENCE TO RELATED APPLICATION(S)

This application claims priority to and the benefit of Indian Patent App. No. 202111059811, filed Dec. 21, 2021, the entirety of which is incorporated herein by reference.

FIELD

The present subject matter relates generally to combustor for a turbine engine, the combustor having one or both of a fuel nozzle and a swirler.

BACKGROUND

An engine, such as a turbine engine that includes a turbine, is driven by combustion of a combustible fuel within a combustor of the engine. The engine utilizes a fuel nozzle to inject the combustible fuel into the combustor. A swirler provides for mixing the fuel with air in order to achieve efficient combustion.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
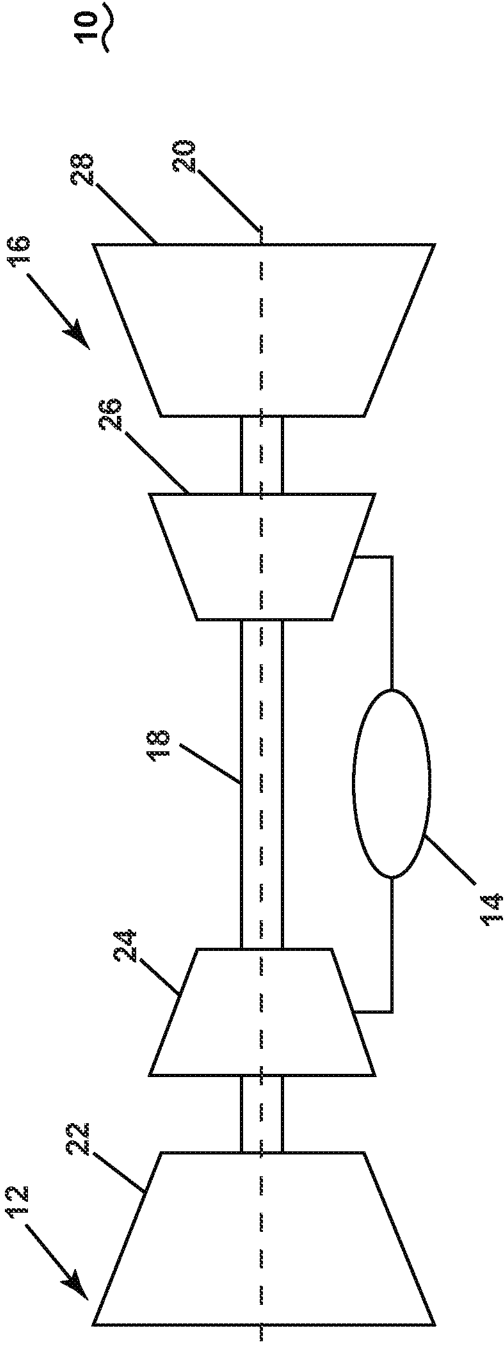
FIG. 1 is a schematic cross-sectional view of an engine in accordance with an exemplary embodiment of the present disclosure.

Aspects of the disclosure herein are directed to a fuel nozzle and swirler architecture located within an engine component, and more specifically to a fuel nozzle structure configured for use with heightened combustion engine temperatures. Such fuels can eliminate carbon emissions, but generate challenges relating to flame holding or flashback due to the higher flame speed and burn temperatures. Current combustors include a durability risk when using such fuels. For purposes of illustration, the present disclosure will be described with respect to a turbine engine for an aircraft with a combustor. It will be understood, however, that aspects of the disclosure herein are not so limited.

Reference will now be made in detail to the fuel nozzle and swirler architecture, and in particular for use with an engine, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The terms “forward” and “aft” refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the term “upstream” refers to a direction that is opposite the fluid flow direction, and the term “downstream” refers to a direction that is in the same direction as the fluid flow. The term “fore” or “forward” means in front of something and “aft” or “rearward” means behind something. For example, when used in terms of fluid flow, fore/forward can mean upstream and aft/rearward can mean downstream.

The term “fluid” may be a gas or a liquid. The term “fluid communication” means that a fluid is capable of making the connection between the areas specified.

The terms “forward” and “aft” refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The term “flame holding” relates to the condition of continuous combustion of a fuel such that a flame is maintained along or near to a component, and usually a portion of the fuel nozzle assembly as described herein, and “flashback” relate to a retrogression of the combustion flame in the upstream direction.

Additionally, as used herein, the terms “radial” or “radially” refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A combustor introduces fuel from a fuel nozzle, which is mixed with air provided by a swirler, and then combusted within the combustor to drive the turbine. Increases in efficiency and reduction in emissions have driven the need to use fuel that burns cleaner or at higher temperatures. There is a need to improve durability of the combustor under these operating parameters, such as improved flame control to prevent flame holding on the fuel nozzle and swirler components.

During combustion, the engine generates high local temperatures. Efficiency and emission needs can require fuels that burn hotter and faster than traditional fuels, or that reduce carbon emissions, which require the use of fuels with higher burn temperatures. Such temperatures and burn speeds can be higher than that of current engine fuels, such that existing engine designs could include durability risks operating under the heightened temperatures required for heightened efficiency and emission standards.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor and turbine sections 12, 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an LP turbine 28, and an HP turbine 26 serially fluidly coupled to one another. The drive shaft 18 can operatively couple the LP compressor 22, the HP compressor 24, the LP turbine 28 and the HP turbine 26 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized air and the combustion gases can together define a working airflow that flows through the fan, compressor section 12, combustion section 14, and turbine section 16 of the turbine engine 10.

Figure 2:
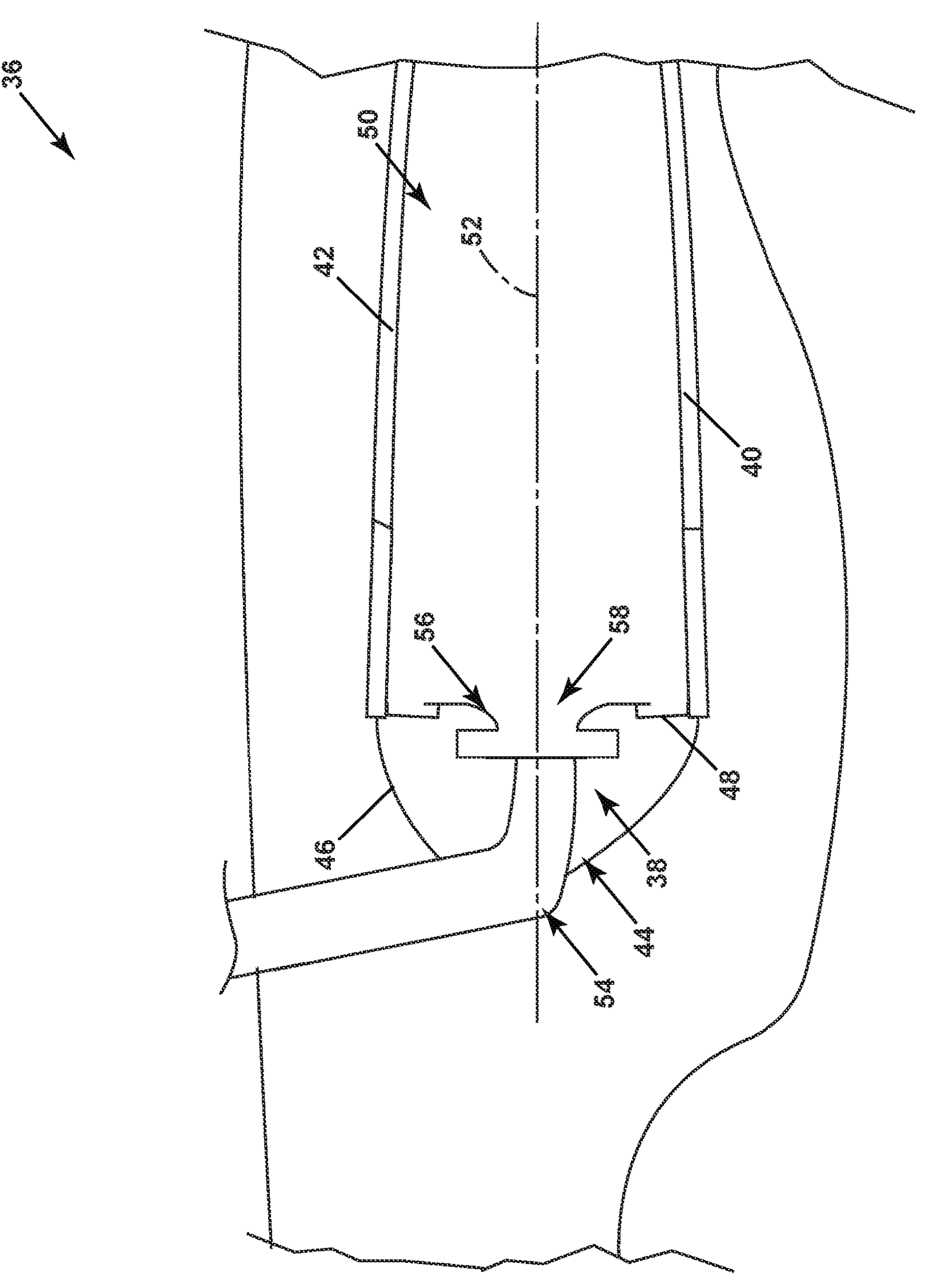
FIG. 2 is a schematic cross-sectional view of a combustor for the engine of FIG. 1 in accordance with an exemplary embodiment of the present disclosure.

FIG. 2 depicts a cross-section view of a generic combustor 36 suitable for use as the combustion section 14 of FIG. 1. The combustor 36 can include an annular arrangement of fuel nozzle assemblies 38 for providing fuel to the combustor 36. It should be appreciated that the fuel nozzle assemblies 38 can be organized as in an annular arrangement including multiple fuel injectors. The combustor 36 can have a can, can-annular, or annular arrangement depending on the type of engine in which the combustor 36 is located. The combustor 36 can include an annular inner combustor liner 40 and an annular outer combustor liner 42, a dome assembly 44 including a dome 46 and a deflector 48, which collectively define a combustion chamber 50 about a longitudinal axis 52. At least one fuel supply 54 is fluidly coupled to the combustion chamber 50 to supply fuel to the combustor 36. The fuel supply 54 can be disposed within the dome assembly 44 upstream of a flare cone 56 to define a fuel outlet 58. A swirler can be provided at the fuel nozzle assemblies 38 to swirl incoming air in proximity to fuel exiting the fuel supply 54 and provide a homogeneous mixture of air and fuel entering the combustor 36.

Figure 3:
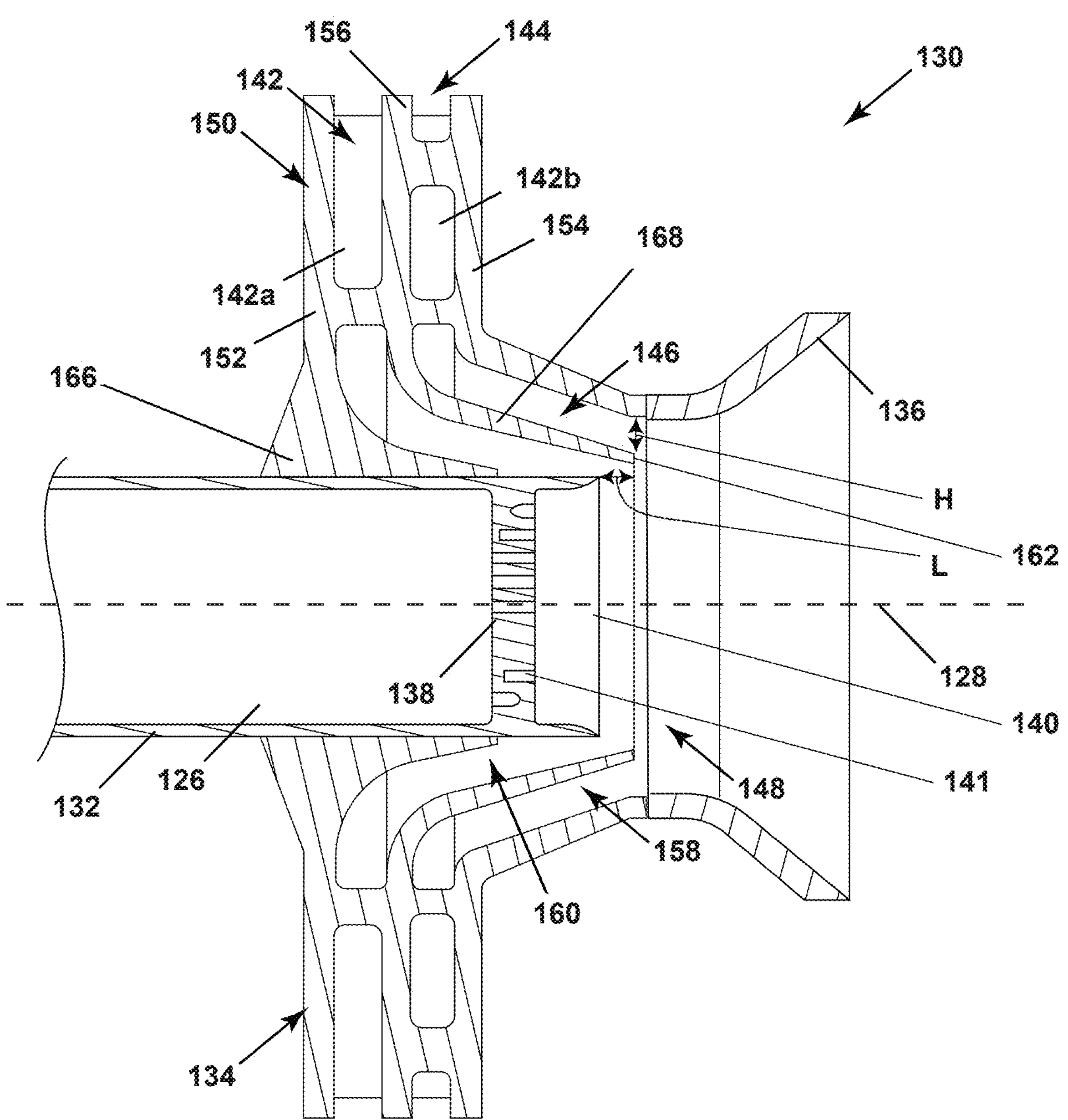
FIG. 3 is a cross-sectional view of a fuel nozzle assembly including a swirler with a splitter, and a fuel nozzle in accordance with an exemplary embodiment of the present disclosure.

FIG. 3 illustrates a fuel nozzle assembly 130, suitable for use in the combustor 36 as the fuel nozzle assembly 38, including a fuel nozzle 132 defining a longitudinal axis 128 and a fuel passage 126, a swirler 134, and a flare cone 136. The fuel nozzle 132 can be a cylindrical conduit, while non-cylindrical conduits are contemplated, including a nozzle cap 138 prior to a nozzle tip 140. The nozzle cap 138 can include a set of openings 141 which may or may not impart a swirl or tangential component to the fuel emitted from the nozzle tip 140. As shown, the openings 141 are oriented tangentially, such that they appear to end within the cap 138 in cross section, while it should be appreciated the openings 141 extend fully through the cap 138 such that fuel can pass through the nozzle cap 138 via the openings 141.

The swirler 134 is arranged annularly about the fuel nozzle 132, with the flare cone 136 extending aft from the swirler 134. The swirler 134 includes a set of vanes 142 in annular arrangement about the fuel nozzle 132. The vanes 142 impart a swirl as a tangential or helical component to an airflow passing through the swirler 134. In operation, an airflow is provided to the swirler 134 at an inlet 144, passed along the vanes 142, and provided to a swirler radial passage 146 terminating at an outlet 148. The vanes 142 impart a swirl to the airflow, which is then turned and exhausted at the outlet 148, where the airflow is provided to the flare cone 136 swirling about a fuel supply provided by the fuel nozzle 132.

The swirler 134 includes a housing 150 having a forward wall 152 and an aft wall 154. A center wall 156 is provided between the forward wall 152 and the aft wall 154, and extends from the swirler inlet 144 to the radial passage 146. The vanes 142 can be separated into two sets of vanes 142*a*, 142*b* by the center wall 156, with a first set of vanes 142*a* arranged as primary vanes within the radially inner passage 160 and a second set of vanes 142*b* arranged as a secondary set of vanes 142*b*.

A splitter 168 extends from the center wall 156 at a trailing edge of the vanes 142 and terminates aft of the fuel nozzle tip 140 at a splitter end 162. The splitter end 162 can be spaced from the aft wall 154 by a radial height H, and the splitter end 162 can be spaced from the forward wall 152 by an axial length. The splitter 168 separates the swirler axial passage 146 into a radially outer passage 158 and a radially inner passage 160, both exhausting to the outlet 148. The radially outer passage 158 can be defined between the splitter 168 and the aft wall 154, as it extends aft turning from a radial direction to a tangential direction, where the splitter 168 and the aft wall 154 can be arranged parallel to one another. Similarly, the radially inner passage 160 can be defined between the splitter 168 and the forward wall 152, as it extends aft and turns from the radial direction to the tangential direction, as well as at least a portion of the fuel nozzle 132. The splitter 168 can be offset from the fuel nozzle 132 such that two are non-parallel, or the splitter 168 is offset or non-parallel to a fuel nozzle longitudinal axis.

In operation, the first set of vanes 142*a* can be arranged to generate a lower swirl or a lower swirl number for an airflow passing through the swirler 134 as opposed to a swirl or relatively higher swirl number for the second set of vanes 142*b*. The variation in swirl among the sets of vanes 142*a*, 142*b* can provide for a high axial velocity for the airflow along an outer diameter of the fuel nozzle 132, and a higher tangential swirl radially exterior thereof, to provide increased flow attachment along the flare cone 136, which can reduce or eliminate flame holding or flashback. The variations provided can reduce or eliminate the occurrence of flame holding or flashback along the fuel nozzle assembly 130, which can permit the use of higher-temperature or faster-burning fuels, such as hydrogen or hydrogen-based fuels, which can provide for decreasing or eliminating carbon emissions without detriment to efficiency, or even improving efficiency as well. In alternative examples where a flare cone includes a constant or decreasing cross-sectional area, it is contemplated that the swirl generated among the sets of vanes 142*a*, 142*b* is the same, or even that the swirl is greater along the radially inner passage 160. In one example, the primary vane swirl number can be between 0 and 0.6, while the secondary vane swirl number can be between 0.0 and 1.4, while it is contemplated that a total or overall swirl number for the flow at the flare cone exit is between 0.2 and 1.2, while wider ranges are contemplated. A swirl number can be defined as the degree of swirl for a swirling flow, which can be defined, in one non-limiting example, by equation (1)

$$S_{CB} = \frac{G_{tg}}{RG_{ax}} = \frac{\int_0^R wur^2\, dr}{R\int_0^R u^2 r\, dr} \tag{1}$$

where $G_{tg}$ represents the axial flux of the tangential momentum, $G_{ax}$ is the axial flux of the axial momentum, R is the outer radius of the annulus, or the radial distance for the swirler, w and u represent the tangential and axial velocity at radial position r, respectively.

Additionally, the radially outer and inner passages 158, 160 can be arranged at a radial angle relative to a longitudinal axis defined by the fuel nozzle 132, which provides for defining a converging cross-sectional area for the radially outer and inner passages 158, 160. The converging cross-sectional area provides for increasing the velocity profile for airflow, which can reduce or eliminate flame holding or flashback.

Furthermore, as the forward wall 152 turns from radial to tangential, the forward wall 152 is shaped to define a foot 166. The foot 166 can be aligned with the splitter 168, for example, such as including parallel walls, while an offset is contemplated. The foot 166 terminates forward of the nozzle tip 140, which provides a step-transition from the swirler 134 to the fuel nozzle 132 at the nozzle tip 140, which can provide for preventing flame holding at the nozzle tip 140. The foot 166 can be advantageous in fuel nozzle assemblies that include a purge flow or a leakage flow between the swirler and the fuel nozzle, such that a purge flow or leakage flow is introduced radially interior of the foot 166, while any fuel nozzle assembly is contemplated. The splitter end 162 is arranged aft of the nozzle tip 140, by the axial length L. The axially-aft positioning of the splitter end 162 provides high-velocity impingement of the airflow on the fuel flow, which can reduce or prevent flame holding and flashback. It is contemplated that the axial length L can be negative, such that the splitter end 162 is positioned forward of the nozzle tip 140, which can provide for improving the velocity profile prior to introducing the swirling airflow to the fuel supply from the fuel nozzle 132. In one example, the axial length L can be between negative ten times minimum passage height and positive ten times the minimum passage height, where the splitter end 162 defines the initial position relative to the nozzle tip 140. More specifically, the axial length L is between-10H to 10H, or that the splitter end 162 is positioned between ten times the radial height extending forward the nozzle tip 140 to ten times the radial height H extending aft of the nozzle tip 140.

Figure 4:
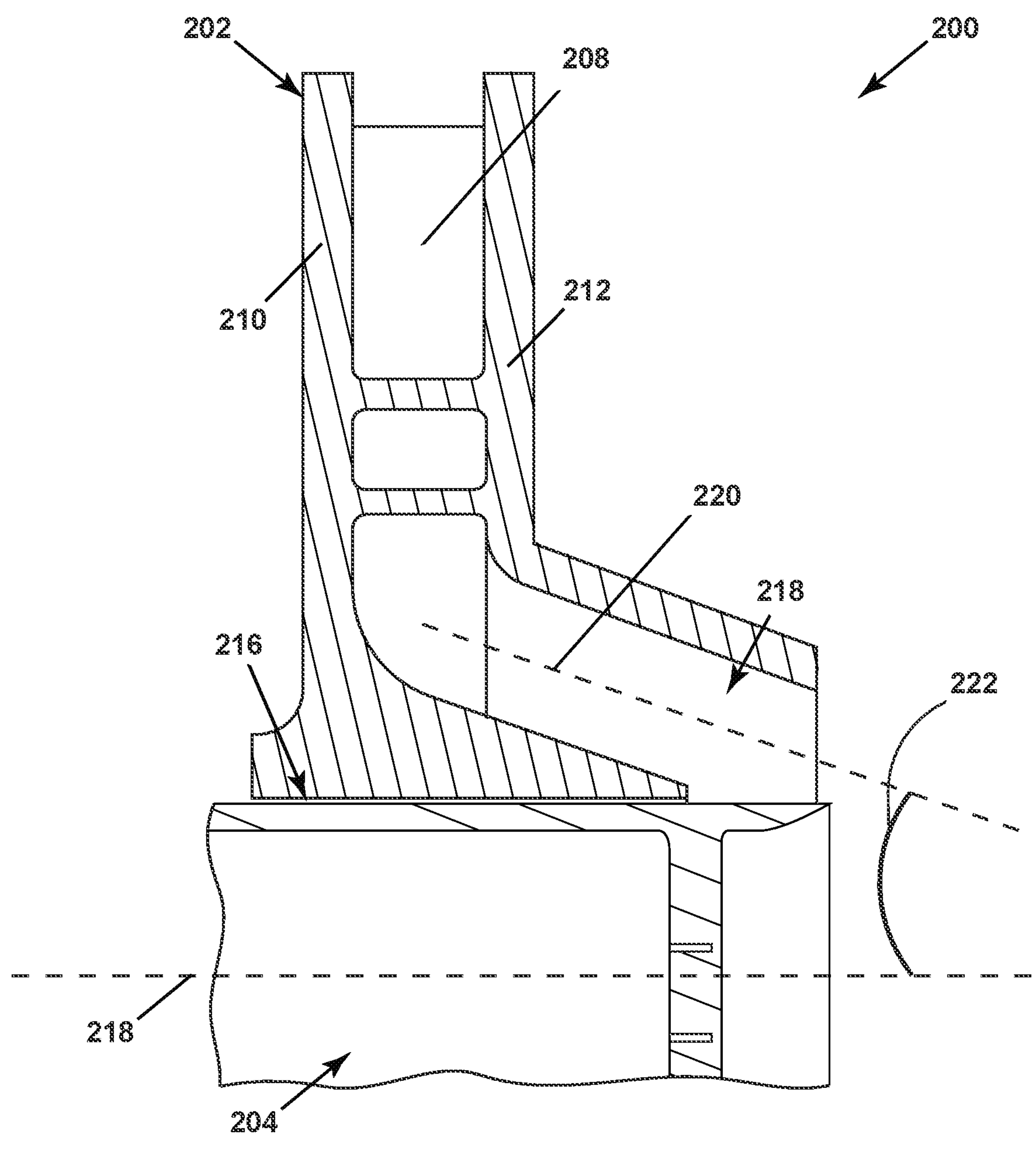
FIG. 4 is a cross-sectional view of an alternative fuel nozzle assembly including a swirler with no splitter, and showing a portion of the fuel nozzle in accordance with an exemplary embodiment of the present disclosure.

FIG. 4 depicts a cross section of an alternative fuel nozzle assembly 200 including a swirler 202 and a fuel nozzle 204. The swirler 202 includes a set of vanes 208 arranged circumferentially about the fuel nozzle 204. The swirler 202 includes a forward wall 210 and an aft wall 212, with swirler vanes 208 extending between the forward wall 210 and the aft wall 212. A radial passage 216 extends through the forward wall 210, while it is contemplated that the radial passage 216 extends through a downstream flare cone. In one example, the radial passage 216 can be arranged parallel to the fuel nozzle 204 or to a longitudinal axis defined by the fuel nozzle 204.

The forward wall 210 and the aft wall 212 define a swirler passage 218, aft of the vanes 208 and defining an axis 220 that is angled toward the fuel nozzle 204. The axis 220 can be arranged at an offset from the fuel nozzle 204 as offset from a longitudinal axis 218. The offset can be defined as an offset angle 222 that can be between 5-degrees and 85-degrees, and orienting the swirler passage 218 to have an angular offset with a radial component directed inward. The swirler passage 218 defines a converging cross-sectional area in the flow direction, which provides a radially-inward velocity component which impinges upon the fuel emitted from the fuel nozzle 204 to increase central positioning of the fuel for the fuel nozzle assembly 200. Maintaining the fuel in the center can provide for a velocity profile that pushes further aft of the fuel nozzle 204, which can reduce recirculation and eliminates flashback or flame holding, while centrally positioning the flame within the combustor can reduce liner temperatures or flame scrubbing.

Figure 5:
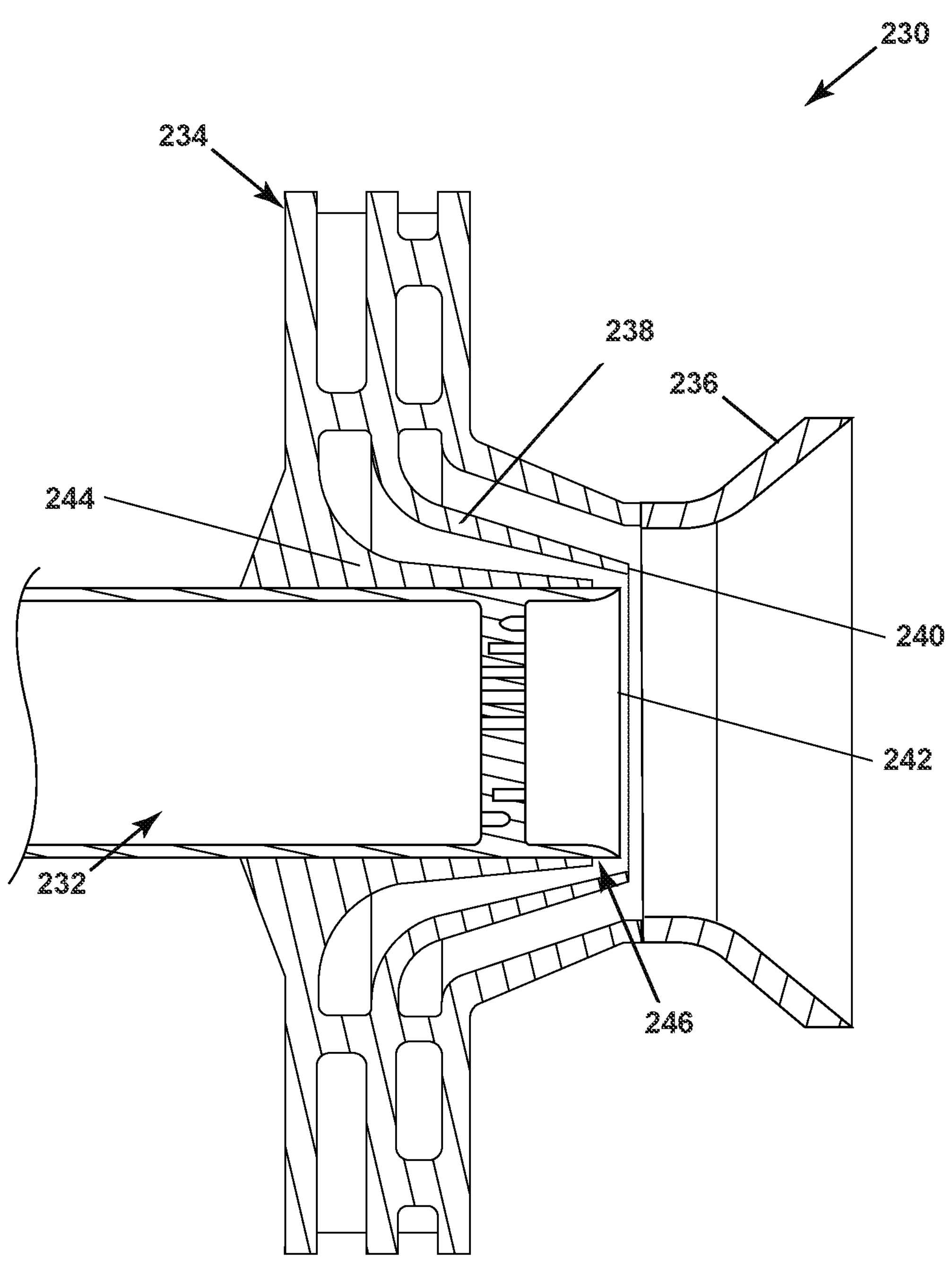
FIG. 5 is a cross-sectional view of another alternative fuel nozzle assembly including a swirler having splitter in accordance with an exemplary embodiment of the present disclosure.

FIG. 5 shows another alternative fuel nozzle assembly 230 including a fuel nozzle 232 and a swirler 234 coupled to a flare cone 236. The swirler 234 includes a splitter 238 that terminates at a splitter aft end 240, and separates the airflow within the splitter into a radially outer flow and a radially inner flow. While the splitter aft end 240 is shown aft of the nozzle 232, it is contemplated that the splitter aft end 240 is co-axial with an aft tip 242 of the fuel nozzle 232. Such an alignment can provide for providing a swirling profile that lays along the flare cone 236 from the outer diameter of the swirler 234, and has a higher velocity component along the fuel nozzle 232, which reduces or prevents flame holding and flashback for the fuel nozzle assembly 230.

Additionally, the swirler 234 includes a foot 244 partially defining the inner diameter. The foot 244 terminates prior to the fuel nozzle tip 242, defining a step 246 at the aft end of the foot 244, which can reduce or prevent flame holding at the fuel nozzle tip 242, particularly where there is a leakage flow or a purge flow utilized with the fuel nozzle assembly 230 or along the fuel nozzle 232.

Figure 6:
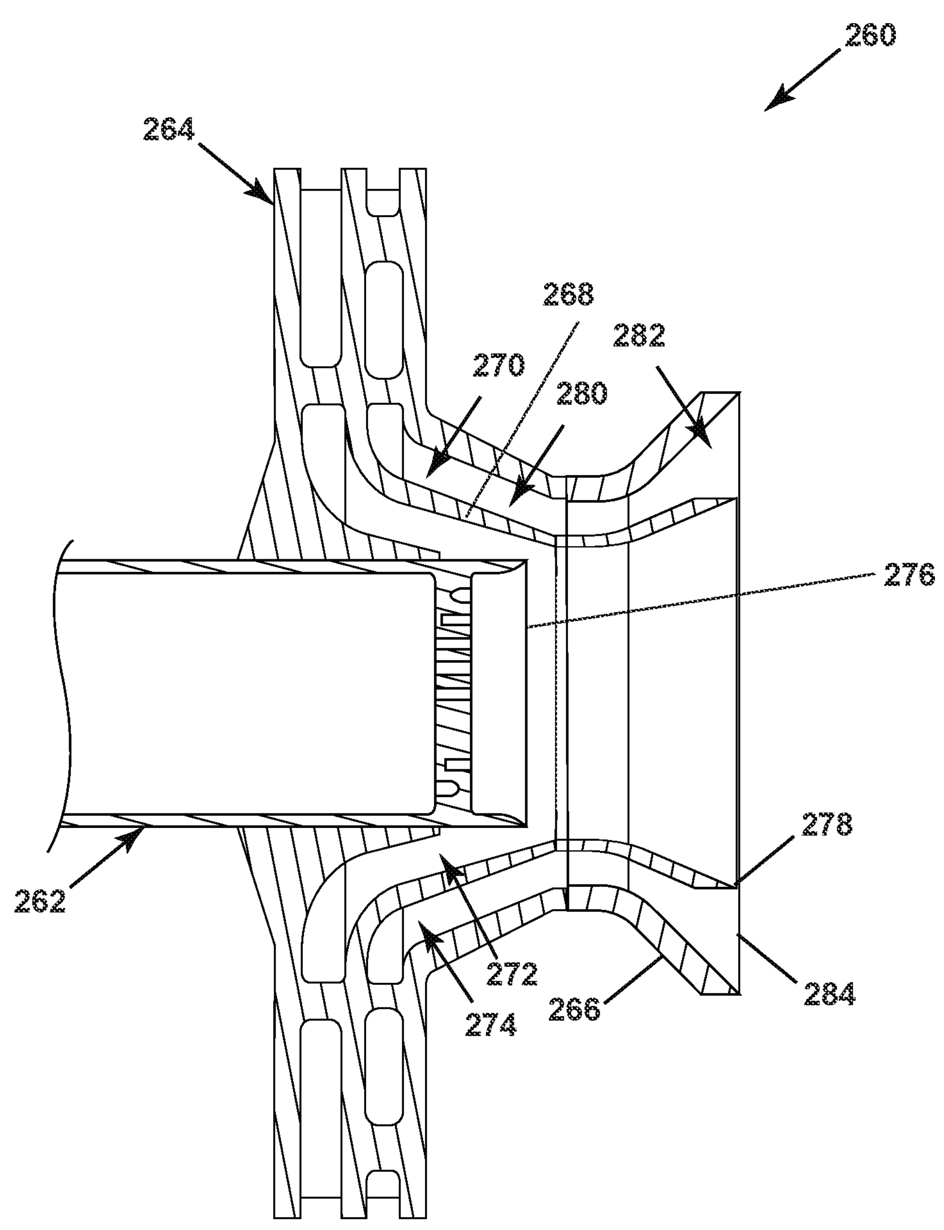
FIG. 6 is a cross-sectional view of yet another alternative fuel nozzle assembly including a swirler having a splitter that extends into a flare cone in accordance with an exemplary embodiment of the present disclosure.

Turning to FIG. 6 another alternative fuel nozzle assembly 260 is shown including a fuel nozzle 262, a swirler 264, and a flare cone 266. The swirler 264 includes a splitter 268, separating a swirler axial passage 270 into a radially inner passage 272 and a radially outer passage 274. The splitter 268 extends aft of a tip end 276 of the fuel nozzle 262, extending axially within the flare cone 266. The splitter 268 can terminate at a splitter end 278. The splitter end 278 can terminate at the same axial position of the flare cone 266, while terminating forward or aft of the flare cone 266 is contemplated. The splitter 268 can include a converging portion 280 and a diverging portion 282 extending from the converging portion 280. The transition from the converging portion 280 to the diverging portion 282 can be positioned aft of a nozzle tip 284, while being aligned with or forward of the nozzle tip 284. The converging portion 280 provides for an increased velocity component for an airflow within the radially inner passage 272, which can reduce or eliminate flame holding or flashback along the fuel nozzle 262. Additionally, the diverging portion 282 provides for maintaining the fuel-air mixture in the center of the fuel nozzle assembly 260, and also provides for reducing temperatures along a combustor liner downstream of the fuel nozzle assembly 260.

In one example, the splitter 268 can be shaped complementary to the flare cone. In another example, the splitter 268 need not include a diverging portion, but can include a constant cross-sectional area or continuing the converging geometry from the splitter 268 circumscribing the fuel nozzle 262. Additionally, a balance can be achieved between converging and diverging portions to provide an increased velocity profile along the fuel nozzle 262, while providing a swirling airflow along the flare cone 266.

Figure 7:
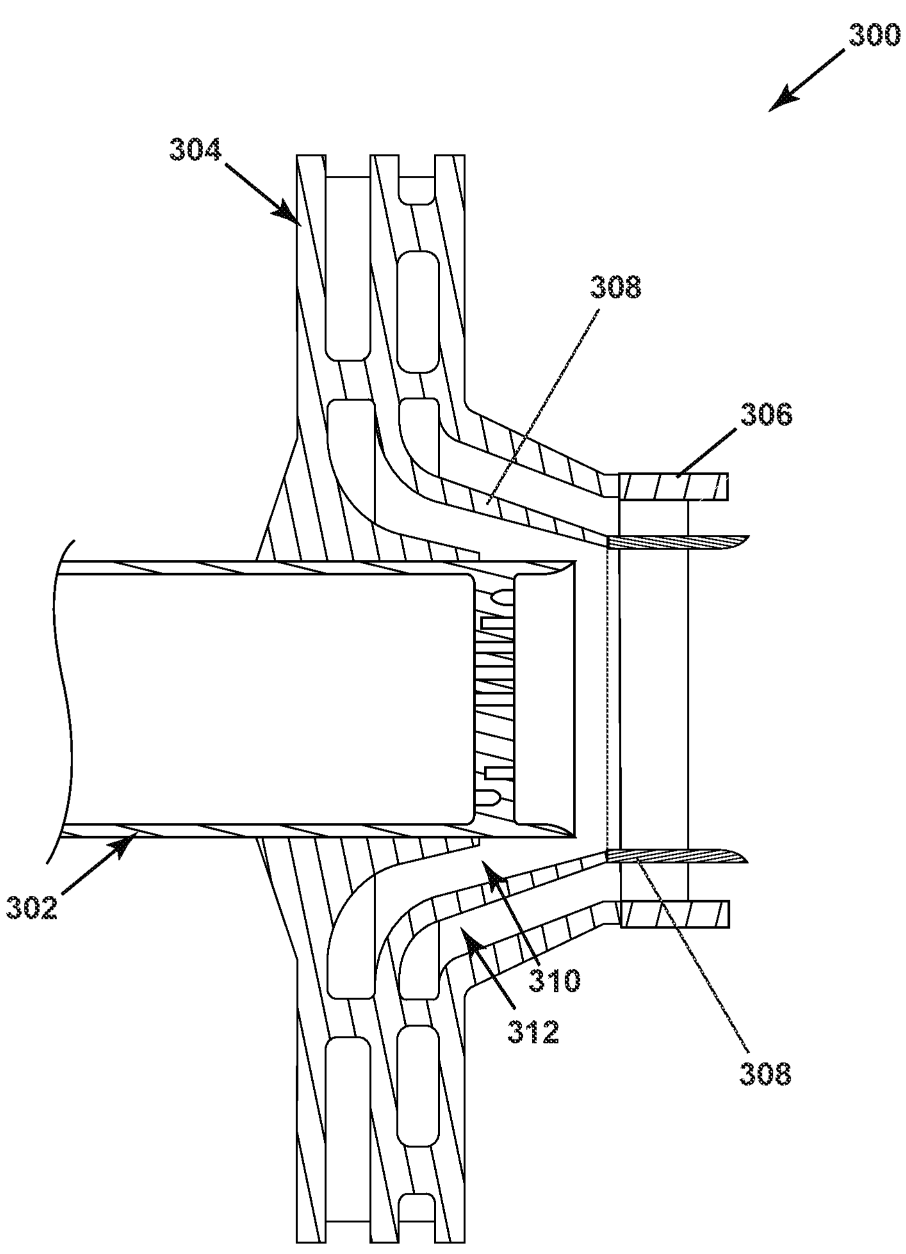
FIG. 7 is a cross-sectional view of yet another alternative fuel nozzle assembly including a swirler with a splitter defining a secondary passage in accordance with an exemplary embodiment of the present disclosure.

FIG. 7 shows another fuel nozzle assembly 300 including a fuel nozzle 302, a swirler 304, and a flare 306. The swirler 304 includes a splitter 308 that extends aft of the fuel nozzle 302. The flare 306 can be shaped to define a cylindrical passage, and can be coaxial with the splitter 308 positioned radially within the flare 306. The flare 306 and splitter 308 can define a primary passage 310 interior of the splitter 308, and an annular secondary passage 312 circumscribing the splitter 308. The secondary passage 312 can provide for positioning the fuel arranged more-centrally within the primary passage 310, which can reduce temperature on a combustor liner downstream of the fuel nozzle 302. The parallel arrangement of the primary passage 310 and the secondary passage 312 downstream of the fuel nozzle 302 provides for a high axial velocity component for the swirling airflows, which can reduce flame holding.

Figure 8:
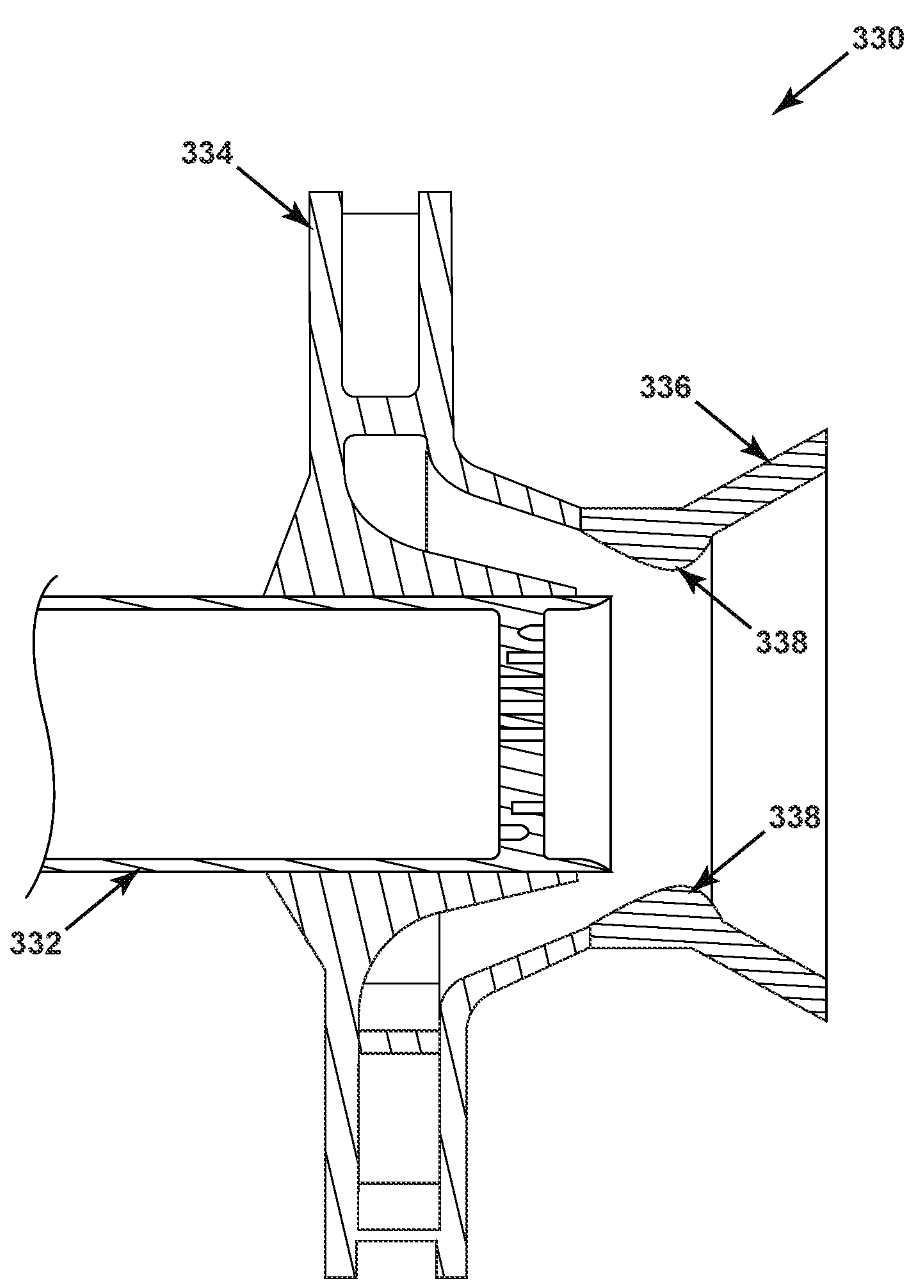
FIG. 8 is a cross-sectional view of yet another alternative fuel nozzle assembly including a protuberance in accordance with an exemplary embodiment of the present disclosure.

FIG. 8 shows another fuel nozzle assembly 330 that includes a fuel nozzle 332, a swirler 334, and a flare cone 336. A protuberance 338 is provided on the flare cone 336. The protuberance 338 can be positioned downstream of the fuel nozzle 332, and can terminate aft and radially exterior of the fuel nozzle 332. Alternative protuberances 338 are contemplated, such that those that are positioned upstream, downstream, or aligned with the fuel nozzle 332, or extend aft of, but radially within the fuel nozzle 332. Similarly, the cross-sectional profile of the protuberance 338 can be semi-circular or oval, while alternative geometries are contemplated, including but not limited to triangular, rounded, circular, curved, linear, curvilinear, squared, stepped, discrete, multiple protuberances, or combinations thereof. While the protuberance 338 is shown as annular, discrete protuberances or sets thereof are contemplated, and having any arrangement, such as aligned, complementary, or offset.

The protuberance 338 can provide a venturi, or a decreased cross-section for the flow, which can be utilized to control the position of a stagnation point for the flow generated by a central recirculation bubble created during operation of the fuel nozzle assembly 330. The ability to position or control the position of the stagnation point, can provide for maintaining a centralized flame, which can provide for reducing or eliminating flame holding or flashback, and reduce temperatures on the downstream combustor liner.

Figure 9:
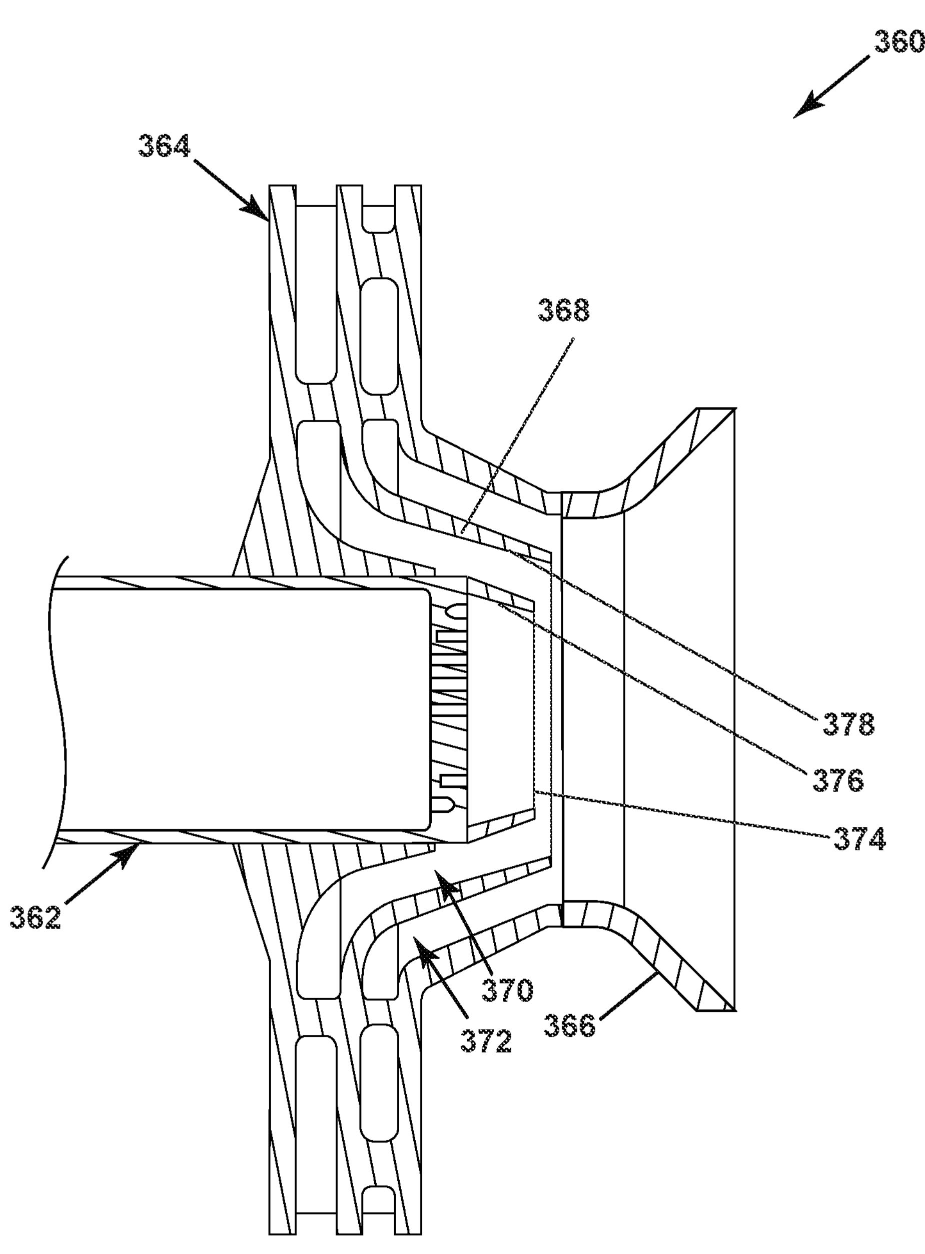
FIG. 9 is a cross-sectional view of yet another alternative fuel nozzle assembly including a fuel nozzle lip in addition to a swirler having a splitter in accordance with an exemplary embodiment of the present disclosure.

FIG. 9 provides another fuel nozzle assembly 360 including a fuel nozzle 362, a swirler 364, and a flare cone 366. The swirler 364 includes a splitter 368, defining a radially inner passage 370 and a radially outer passage 372. The fuel nozzle 362 terminates at a nozzle tip 374. The nozzle tip 374 can converge, defining a decreasing cross-sectional area along the nozzle tip 374, which can accelerate a flow of fuel emitted from the fuel nozzle 362.

The nozzle tip 374 can converge at a constant rate, defining a linear wall for the profile of the nozzle tip 374, as shown in FIG. 9, while non-constant rates are contemplated, which would define a curved profile. An interior surface 376 of the nozzle tip 374 can be arranged parallel to an interior surface 378 of the splitter 368, which can reduce shear between interior flows within the inner passage 370 and the outer passage 372. Alternatively, the interior surface 376 can be slightly offset from parallel, such as +/−5-degrees. Alternatively, the inner surfaces 376, 378 can be arranged at an angle relative to one another, such that the radially inner passage 370 defines a converging, constant, or diverging cross-sectional area extending in the direction of the flow.

The variation in cross-sectional area can be utilized to define a velocity profile for the air and fuel supplies to reduce or eliminate flame holding or flashback, as well as reduce other local temperatures, such as along the flare cone 366 and combustion liner. Such benefits permit the use of higher-temperature or faster-burn fuels, such as hydrogen or hydrogen mixes, which can provide efficiency and carbon emission elimination with a fully hydrogen fuel, or reduction by utilizing hydrogen fuel blends.

It should be appreciated that the examples used herein are not limited specifically as shown, and a person having skill in the art should appreciate that aspects from one or more of the examples can be intermixed with one or more aspect from other examples to define examples that can differ from the examples as shown.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses: a turbine engine comprising: a compressor section, combustor section, and turbine section in serial flow arrangement, with the combustor section including a fuel nozzle assembly comprising: a fuel nozzle defining longitudinal axis, including a fuel passage terminating at a nozzle tip; and a swirler, defining a swirler passage, provided about the fuel nozzle, the swirler comprising: a forward wall, an aft wall spaced from the forward wall, a center wall provided between the forward wall and the aft wall, a first set of vanes extending between the forward wall and the center wall, and a second set of vanes extending between the center wall and the aft wall, wherein the first set of vanes are configured to impart a tangential swirl to a flow passing through the swirler that is less than that of a tangential swirl imparted by the second set of vanes.

The turbine engine of any preceding clause, further comprising a splitter extending from the center wall, separating the swirler passage into a radially inner passage and a radially outer passage.

The turbine engine of any preceding clause, wherein the splitter terminates aft of the nozzle tip.

The turbine engine of any preceding clause, further comprising a flare cone extending from the swirler, wherein the splitter extends at least partially within the flare cone.

The turbine engine of any preceding clause, wherein the splitter provided within the flare cone is coaxial with the flare cone.

The turbine engine of any preceding clause, wherein the nozzle tip defines a converging cross section.

The turbine engine of any preceding clause, wherein the radially inner passage defines a decreasing distance between the forward wall and the splitter extending in the flow direction.

The turbine engine of any preceding clause, wherein the radially outer passage defines a constant distance between the aft wall and the splitter extending in the flow direction.

The turbine engine of any preceding clause, wherein the forward wall further includes a foot.

The turbine engine of any preceding clause, wherein the nozzle tip is positioned aft of the foot.

A fuel nozzle assembly comprising: a fuel nozzle, defining a longitudinal axis, includes a fuel passage and terminates at a nozzle tip; and an annular swirler circumscribing the fuel nozzle, the swirler defining a swirler passage and a flow direction through the swirler passage, the swirler comprising: a forward wall, an aft wall spaced from the forward wall, a center wall provided between the forward wall and the aft wall, and a first set of vanes extending between the forward wall and the center wall, and a second set of vanes extending between the center wall and the aft wall, wherein the first set of vanes are configured to impart a tangential swirl to a flow passing through the swirler that is less than that of a tangential swirl imparted by the second set of vanes.

The fuel nozzle assembly of any preceding clause, wherein the swirler passage downstream of the set of vanes defines a swirler passage axis that is offset from the longitudinal axis by an offset angle.

The fuel nozzle assembly of any preceding clause, wherein the forward wall further includes a foot, wherein the foot defines the offset angle for the longitudinal axis.

The fuel nozzle assembly of any preceding clause, wherein the offset angle is between 5-degrees and 85-degrees.

The fuel nozzle assembly of any preceding clause, wherein the forward wall terminates at a foot, and wherein the foot terminates forward of the nozzle tip.

The fuel nozzle assembly of any preceding clause, further comprising a radial passage provided between the fuel nozzle and the foot.

The fuel nozzle assembly of any preceding clause, further comprising a flare cone extending from the swirler, wherein the flare cone includes a protuberance.

The fuel nozzle assembly of any preceding clause, wherein the swirler further comprises a splitter separating the swirler passage into a radially interior passage and a radially exterior passage.

The fuel nozzle assembly of any preceding clause, wherein the splitter is arranged parallel to at least a portion of the aft wall.

The fuel nozzle assembly of any preceding clause, wherein the splitter is offset from the fuel nozzle.

A fuel nozzle assembly comprising: a fuel nozzle, defining a longitudinal axis, includes a fuel passage and terminates at a nozzle tip; and an annular swirler circumscribing the fuel nozzle, the swirler defining a swirler passage and a flow direction through the swirler passage, the swirler comprising: a forward wall, an aft wall spaced from the forward wall, and a set of vanes extending between the forward wall and the aft wall, wherein the swirler passage downstream of the set of vanes defines a swirler passage axis that is offset from the longitudinal axis by an offset angle.

The fuel nozzle assembly of any preceding clause, wherein the offset angle is between 5-degrees and 85-degrees.

The fuel nozzle assembly of any preceding clause, wherein the forward wall terminates at a foot, and wherein the foot terminates forward of the nozzle tip.

The fuel nozzle assembly of any preceding clause, further comprising a radial passage provided between the fuel nozzle and the foot.

The fuel nozzle assembly of any preceding clause, further comprising a flare cone extending from the swirler, wherein the flare cone includes a protuberance.

The fuel nozzle assembly of any preceding clause, wherein the swirler further comprises a splitter separating the swirler passage into a radially interior passage and a radially exterior passage.

The fuel nozzle assembly of any preceding clause, wherein the splitter is arranged parallel to at least a portion of the aft wall.

The fuel nozzle assembly of any preceding clause, wherein the splitter is offset from the fuel nozzle.

A method of mixing fuel and air in a combustor for a gas turbine engine, the method comprising: injecting a supply of fuel into the combustor to form a fuel flow; surrounding at least a portion of the fuel flow with a first swirling air flow having a first swirl number; and surrounding at least a portion of the first swirling air flow with a second swirling air flow having a second swirl number, which is greater than the first swirl number.

The method of any preceding clause, wherein the swirl direction is the same for the first and second swirling air flows.

What is claimed is:

1. A turbine engine comprising:

a compressor section, a combustor section, and a turbine section in serial flow arrangement, wherein the combustor section including a fuel nozzle assembly comprising:

a fuel nozzle defining a central longitudinal axis, and including a central gaseous fuel passage extending along the central longitudinal axis, the fuel nozzle terminating at a nozzle tip, with a nozzle cap located in the central gaseous fuel passage upstream of the nozzle tip and having multiple orifices through which a flow of gaseous fuel passes; and a swirler, having a first swirler passage and a second swirler passage, provided about the fuel nozzle, the swirler comprising:

a forward wall terminating along the fuel nozzle at a location upstream of the nozzle tip, an aft wall spaced from the forward wall, a center wall provided between the forward wall and the aft wall and defining the first swirler passage between the center wall and the forward wall, and further defining the second swirler passage between the center wall and the aft wall, a first set of vanes extending between the forward wall and the center wall, a second set of vanes extending between the center wall and the aft wall, and a splitter extending from the center wall and further defining the first swirler passage between the splitter and the forward wall and the second swirler passage between the splitter and the aft wall, wherein the first set of vanes are arranged to impart a first tangential swirl to a first air flow passing through the first swirler passage, the first air flow having a first axial velocity with respect to the central longitudinal axis along an exterior of the fuel nozzle circumscribing the flow of gaseous fuel emitted from the nozzle tip, wherein the second set of vanes are arranged to impart a second tangential swirl to a second air flow passing through the second swirler passage, the second air flow circumscribing the first air flow and having a second axial velocity with respect to the central longitudinal axis, wherein the first tangential swirl is less than the second tangential swirl such that the second axial velocity is slower than the first axial velocity, wherein the first tangential swirl has a first swirl number of greater than 0 and less than or equal to 0.6, while the second tangential swirl has a second swirl number of greater than 0 and less than or equal to 1.4, wherein the fuel nozzle is configured to receive hydrogen fuel, and wherein the splitter terminates at a splitter end that is spaced a length from the nozzle tip axially with respect to the center longitudinal axis, the splitter end is located a height from the aft wall radially with respect to the center longitudinal axis, and the length is greater than or equal to −10 times the height and less than or equal to 10 times the height.

2. The turbine engine of claim 1, wherein the splitter terminates aft of the nozzle tip.

3. The turbine engine of claim 1, wherein the forward wall further includes a foot abutting the fuel nozzle.

4. The turbine engine of claim 3, wherein the nozzle tip is positioned aft of the foot.

5. The turbine engine of claim 3, wherein the foot defines a step between the swirler and the fuel nozzle, the step being configured to receive a purge airflow directed radially between the foot and the fuel nozzle.

6. The turbine engine of claim 1, wherein the nozzle tip defines a diverging cross section.

7. The turbine engine of claim 1, wherein the splitter defines a converging section and the converging section includes the splitter end.

8. The turbine engine of claim 7, wherein the nozzle tip projects axially downstream beyond the forward wall of the swirler such that a terminal end of the nozzle tip is positioned upstream of the splitter end and exposed to the first air flow along the exterior of the fuel nozzle, the nozzle tip being configured to promote high-velocity impingement of the first air flow on the flow of gaseous fuel emitted from the nozzle tip to reduce flame holding and flashback.

9. The turbine engine of claim 1, wherein the multiple orifices impart a third tangential swirl to the flow of gaseous fuel.

10. The turbine engine of claim 9, wherein a first direction of the first tangential swirl and a second direction of the second tangential swirl are the same.

11. The turbine engine of claim 1, wherein the combustion section has a combustion chamber, and the fuel nozzle assembly further comprises a flare cone located downstream of the forward wall, the flare cone extending aft of the swirler and defining a fuel outlet opening into the combustion chamber, the flare cone defining a region that diverges radially outward from the central longitudinal axis in a downstream axial direction.

12. A fuel nozzle assembly comprising:

a fuel nozzle, defining a central longitudinal axis, includes a central gaseous fuel passage extending along the central longitudinal axis and terminating at a nozzle tip, with a nozzle cap located in the central gaseous fuel passage upstream of the nozzle tip and having multiple orifices through which a flow of gaseous fuel passes; and an annular swirler circumscribing the fuel nozzle, the annular swirler defining a first swirler passage and a second swirler passage, the annular swirler comprising:

a forward wall, an aft wall spaced from the forward wall, a center wall provided between the forward wall and the aft wall and defining the first swirler passage between the center wall and the forward wall, and further defining the second swirler passage between the center wall and the aft wall, and a first set of vanes extending between the forward wall and the center wall, a second set of vanes extending between the center wall and the aft wall, and a splitter extending from the center wall and further defining the first swirler passage between the splitter and the forward wall and the second swirler passage between the splitter and the aft wall, wherein the first set of vanes are configured to impart a first tangential swirl to a first air flow passing through the first swirler passage, the first air flow having a first axial velocity with respect to the central longitudinal axis along an exterior of the fuel nozzle circumscribing the flow of gaseous fuel emitted from the nozzle tip;

wherein the second set of vanes are configured to impart a second tangential swirl to a second air flow passing through the second swirler passage, the second air flow circumscribing the first air flow and having a second axial velocity with respect to the central longitudinal axis;

wherein the first tangential swirl is less than the second tangential swirl such that the second axial velocity is slower than the first axial velocity;

wherein the first tangential swirl has a first swirl number of greater than 0 and less than or equal to 0.6, while the second tangential swirl has a second swirl number of greater than 0 and less than or equal to 1.4, wherein the fuel nozzle is configured to receive hydrogen fuel, and wherein the splitter terminates at a splitter end that is spaced a length from the nozzle tip axially with respect to the center longitudinal axis, the splitter end is located a height from the aft wall radially with respect to the center longitudinal axis, and the length is greater than or equal to −10 times the height and less than or equal to 10 times the height.

13. The fuel nozzle assembly of claim 12, wherein the forward wall terminates at a foot, and wherein the foot terminates forward of the nozzle tip.

14. The fuel nozzle assembly of claim 12, wherein the splitter is arranged parallel to at least a portion of the aft wall.

15. The fuel nozzle assembly of claim 12, wherein the multiple orifices of the nozzle cap are configured to impart a third tangential swirl to the flow of gaseous fuel passing through the nozzle cap.

16. The fuel nozzle assembly of claim 12, wherein the nozzle tip defines a diverging cross section.

17. The fuel nozzle assembly of claim 12, wherein the splitter defines a converging section and the converging section includes the splitter end.

18. The fuel nozzle assembly of claim 12, further comprising a flare cone located downstream of the forward wall, the flare cone extending aft of the annular swirler and defining a fuel outlet opening into a combustion chamber, the flare cone defining a region that diverges radially outward from the central longitudinal axis in a downstream axial direction.

19. A turbine engine comprising:

a compressor section, a combustor section, and a turbine section in serial flow arrangement, wherein the combustor section including a fuel nozzle assembly comprising:

a fuel nozzle defining a central longitudinal axis, and including a central gaseous fuel passage extending along the central longitudinal axis, the fuel nozzle terminating at a nozzle tip, with a nozzle cap located in the central gaseous fuel passage upstream of the nozzle tip and having multiple orifices through which a flow of gaseous fuel passes; and a swirler, having a first swirler passage and a second swirler passage, provided about the fuel nozzle, the swirler comprising:

a forward wall terminating along the fuel nozzle at a location upstream of the nozzle tip, an aft wall spaced from the forward wall, a center wall provided between the forward wall and the aft wall and defining the first swirler passage between the center wall and the forward wall, and further defining the second swirler passage between the center wall and the aft wall, with a first air flow and a second air flow from the compressor section respectively supplied to the first swirler passage and the second swirler passage, a first set of vanes extending between the forward wall and the center wall, a second set of vanes extending between the center wall and the aft wall, and a splitter extending from the center wall and further defining the first swirler passage between the splitter and the forward wall and the second swirler passage between the splitter and the aft wall, wherein the first set of vanes are arranged to impart a first tangential swirl to the first air flow passing through the first swirler passage, the first air flow having a first axial velocity with respect to the central longitudinal axis along an exterior of the fuel nozzle circumscribing the flow of gaseous fuel emitted from the nozzle tip, wherein the second set of vanes are arranged to impart a second tangential swirl to the second air flow passing through the second swirler passage, the second air flow circumscribing the first air flow and having a second axial velocity with respect to the central longitudinal axis, wherein the first tangential swirl is less than the second tangential swirl such that the second axial velocity is slower than the first axial velocity, wherein the first tangential swirl has a first swirl number of greater than 0 and less than or equal to 0.6, while the second tangential swirl has a second swirl number of greater than 0 and less than or equal to 1.4, wherein the fuel nozzle is configured to receive hydrogen fuel, and wherein the splitter terminates at a splitter end that is spaced a length from the nozzle tip axially with respect to the center longitudinal axis, the splitter end is located a height from the aft wall radially with respect to the center longitudinal axis, and the length is greater than or equal to −10 times the height and less than or equal to 10 times the height.

20. The turbine engine of claim 19, wherein the splitter end is located aft of the nozzle tip.

* * * * *